United States Patent [19]
Livesay et al.

[11] Patent Number: 5,500,164
[45] Date of Patent: Mar. 19, 1996

[54] METHOD AND APPARATUS FOR PRODUCING LARGE FIBER REINFORCED STRUCTURES

[75] Inventors: Mark Livesay, El Cajon, Calif.; William Gallup, Orlando, Fla.

[73] Assignee: Synergistic Composite Systems Inc., Houston, Tex.

[21] Appl. No.: 236,894

[22] Filed: May 2, 1994

[51] Int. Cl.⁶ ............................................. B29C 70/44
[52] U.S. Cl. ..................... 264/459; 264/510; 264/102; 264/478
[58] Field of Search ............................. 264/510, 511, 264/101, 102, 257, 258, 316; 425/388, 405.1

[56] References Cited

U.S. PATENT DOCUMENTS

| | | | |
|---|---|---|---|
| 4,132,755 | 1/1979 | Johnson | 425/405.1 |
| 4,942,013 | 7/1990 | Palmer et al. | 264/511 |
| 5,183,619 | 2/1993 | Tolton | 264/316 |
| 5,281,388 | 1/1994 | Palmer et al. | 264/316 |
| 5,316,462 | 5/1994 | Seemann | 264/316 |
| 5,322,665 | 6/1994 | Bernardon et al. | 264/316 |

FOREIGN PATENT DOCUMENTS

| | | | |
|---|---|---|---|
| 2007054 | 9/1971 | Germany | 264/510 |
| 54-038384 | 3/1979 | Japan | 264/101 |

*Primary Examiner*—Catherine Timm
*Attorney, Agent, or Firm*—John Lezdey

[57] ABSTRACT

The invention provides a method and apparatus for forming a large cured reinforced composite structure. The method comprises placing at least one reinforcing fiber mat or fabric into a desired form and enclosing the fiber mat or fabric within a sealed envelope which contains a vacuum port and a resin supply conduit. The supply conduit introduces a curable resin at a rate not to exceed the rate of evacuation. The envelope is filled and the resin is cured.

12 Claims, 3 Drawing Sheets

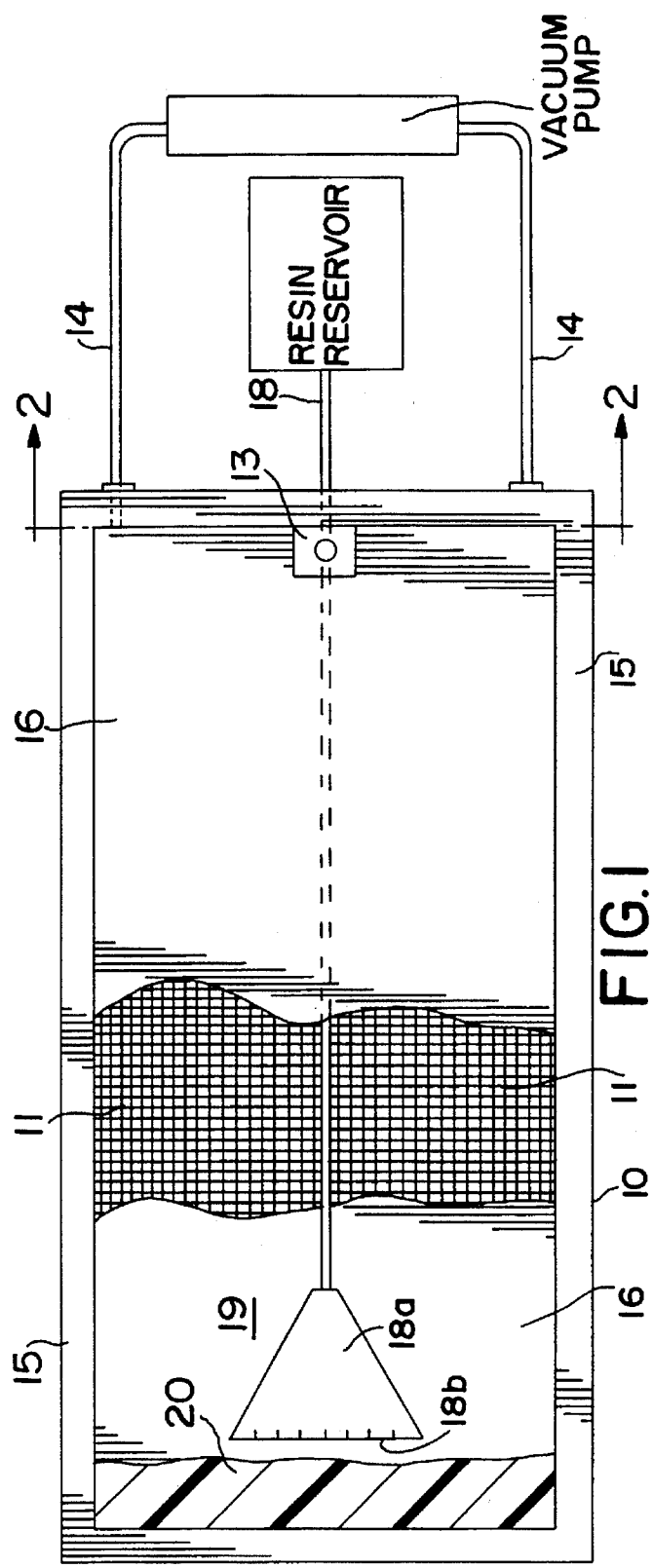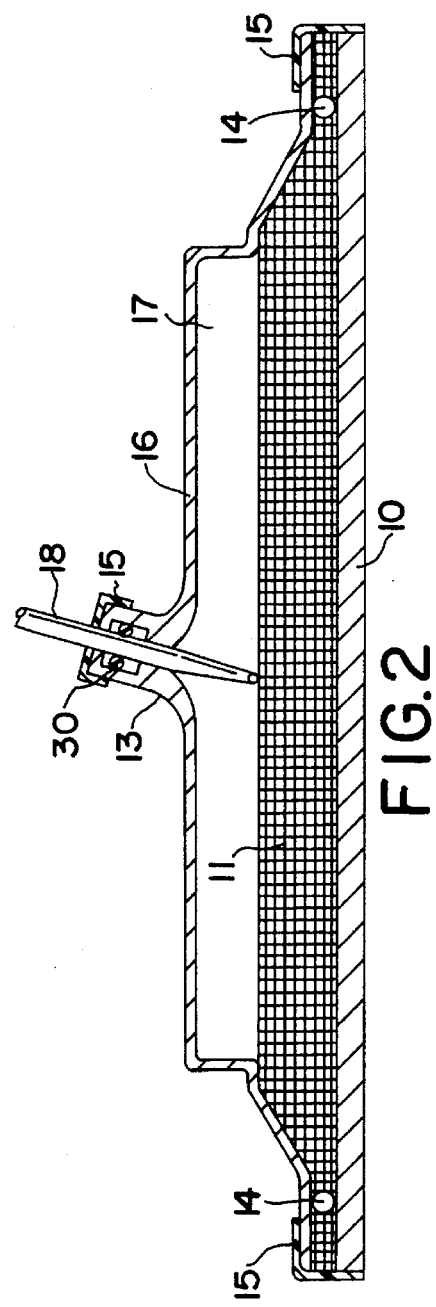

METHOD AND APPARATUS FOR PRODUCING LARGE FIBER REINFORCED STRUCTURES

FIELD OF THE INVENTION

This invention relates to an improved method and apparatus for producing cured fiber reinforced-resin structures. In particular, it relates to improvements in the production of and repair of large assemblies, i.e., ships, holding tanks, panels, bridge columns, aircraft, space vehicles, etc.

DESCRIPTION OF THE PRIOR ART

Fiber reinforced-resin composites have found a broad utility in structure requiring high strength-to-weight ratios. The fiber reinforced-resin composites used in such products have usually been produced by forming a lay-up, e.g., layers or plies of unidirectional or multidirectional fabrics made of glass or graphite fibers, impregnated with a resin and cured. This resin impregnation is generally done by either a wet lay-up or dry lay-up technique. In the wet lay-up process the fibrous reinforcement materials are preimpregnated with a resin and curing catalyst and partially cured.

Such "prepregs" are positioned upon a forming tool or a mold surface which, in its simplest form may comprise a flat plate. In the dry lay-up method, the fiber reinforcement is laid up dry on a forming tool or a mold surface and the resin may be applied by conventional methods known to the art, e.g., brushing, spraying or coating, etc.

After the lay-up is prepared, heat and pressure are applied. The heat cures the resin and the pressure compresses the lay-up preventing air and other gases, including volatile gases, from forming voids as the resin cures. The curing process is generally carried out in an autoclave.

While monolithic structures formed of fiber reinforced-resin composites processed in the manner described above are satisfactory for some environments they have certain disadvantages. For example, in using the fibers preimpregnated with resin, gases trapped between the layers when the resin is being cured form weakening voids in the resultant monolithic structure.

Another disadvantage with prepregs is the need to store such material at low temperatures. Conventionally, preimpregnated fiber reinforced layers, which are usually in the form of relatively wide tape or fabric on rolls prior to being laid up, are stored in a refrigerator environment. A further disadvantage is that even at low temperature, the resin will cure and may become unusable and must be discarded.

The disadvantages in the dry lay-up process include the use of more resin and more assembly time. The manner of resin application by brushing or spraying wastes resin and requires the removal of the excess resin before the curing process. Additionally, some manual smoothing may be necessary and the sticky resin makes it difficult not to avoid displacement of the reinforcement fibers which adds to production delays.

Vacuum bag techniques are well known in the art and encompass both the dry lay-up and the wet lay-up processes. After the reinforced fiber is laid up on a forming tool or mold surface, a flexible gas impervious sheet, liner or bag is used to form a sealed vacuum envelope over the lay-up, a liquid resin is introduced into the envelope and a vacuum is drawn on the interior envelope space. The vacuum induces an internal collapse of the film envelope against the mold surface and forces the fiber mat or fabric to follow the mold pattern and pushes or pulls out voids. Thereafter, heat is applied to cure the resin.

The internal collapse of the vacuum envelope restricts the resin from freely flowing through the fiber mat or fabric which has a tendency to trap air and other vapors between the vacuum film envelope and the composite structure so as to result in low reinforcing fiber-to-resin ratio and nonuniformity. This reduces production rates and increases production failures and costs.

Some of the presently known vacuum bag techniques avoid some of the above discussed problems by employing a breather fabric with a plastic film which is positioned between the dry lay-up and the inside of the vacuum bag and barrier materials to prevent resin from reaching and plugging the vacuum lines in the bag. The breather bag functions to prevent the outer bag from collapsing completely on the lay-up.

Another approach to preventing bag closure is disclosed in U.S. Pat. No. 4,902,215 to Seemann which relates to a resin distribution medium comprising spaced-apart plastic monofilaments which are non-resin absorptive running criss-cross and an open array of separated raised segments providing vertically oriented space-apart props or pillars to prevent closure between the inner face of the flexible sheet and the upper surface of the dry lay-up. The open pillar-like structure and lateral openings between these pillars provides channel for resin flow over the entire distribution medium without an entrainment of air or other gases. Both the breather fabric and the reusable resin distribution system of Seemann require additional expense in equipment and in production time.

Another approach to improving vacuum bag resin transfer molding techniques involves an improved vacuum bag. U.S. Pat. No. 5,129,813 to Shepherd discloses a non-porous material having a three dimensional pattern defining a plurality of interconnected channels which upon collapsing upon the evacuation of the vacuum bag, the three dimensional pattern relaxes into a locally flat tow dimensional configuration. The completely evacuated vacuum bag is in direct contact over the entire surface of the lay-up and the interconnected channels provides free flow of resin and avoids entrapment of air and gas pockets. The flexible film used in making the vacuum bag also can be reused.

All of the presently known vacuum bag molding methods, however, employ static fixed inlet feed positions reactant, i.e., feed inlets which are not adaptable for large structures. Particularly, since the resin encounters greater flow resistant as it flows over an enlarged area of reinforced fiber.

Since the reactant feed positions are not movable, the resin encounters greater flow resistance as it flows over a much larger area, which along with the resistance of the additional reinforcing fiber, lengthens the filling time of the mold surface. In some cases, the catalyzed resin system has a short pot life and the delay in filling the mold surface allows the resin to partially cure and the increase in viscosity prevents further resin transfer. In addition to the resin transfer problem, it is difficult to heat large structures evenly especially if the work is performed out of doors.

Another disadvantage of the prior art methods used to mold or repair large structures is that when done in multiple sections, these sections have the problem of maintaining a strong bond line between the different sections as they are cured and to preserve smoothness at these bond lines.

A further disadvantage associated with prior art methods is in the instance where flow must rise vertically, the flow height is limited to about fifteen feet.

Therefore, there exists a need for an improved vacuum bag molding techniques which can be used for the fabrication or repair of large structures such as ships, boats, bridge columns, holding tanks, etc. That is, the method of the invention is suitable for forming structures which are at least five feet in length and/or width.

The process and apparatus of the invention provides easier resin flow into the fiberglass lay-up and solves the wetting out problem which occurs when large composite structures are being formed, especially when in a vertical position.

The process and apparatus of the invention further solves the problem of bond lines which are formed in the prior art when multiple panels are joined to form a large structure.

SUMMARY OF THE INVENTION

According to the present invention there is provided a method and apparatus for forming a large cured reinforced composite structure. The method comprises placing at least one reinforcing fiber mat or fabric into a desired form and enclosing the fiber mat in an envelope comprising a fluid impervious material having at least one vacuum port and at least one curable resin supply inlet having a gas tight seal and supply conduit inserted therethrough. The supply conduit is positioned at the opposite end of the vacuum envelope and the envelope is evacuated. The curable resin is introduced through a supply conduit at a rate of flow up to about the rate of evacuation and to establish and maintain a resin front to uniformly distribute the resin to every part of the vacuum envelope. The evacuation is stopped when the envelope is filled. The conduit is removed and the resin is cured.

The process of the invention further provides an improved method for bonding a cured section and a new section or part which is being laid down and subsequently cured.

BRIEF DESCRIPTION OF THE DRAWINGS

The foregoing objects and many of the attendant advantages of this invention will become more readily appreciated in the following detailed description when taken in conjunction with the accompanying drawings.

FIG. 1 is a top plan view of a molding assembly of planar shape, the assembly provides a gas impervious vacuum envelope having a supply inlet means and a vacuum outlet means, a dry preform on a mold surface and a movable resin formed in accordance with the invention.

FIG. 2 is an enlarged partial cross-sectional view along line 2—2 of FIG. 1.

DESCRIPTION OF THE PREFERRED EMBODIMENTS

Figure 3:
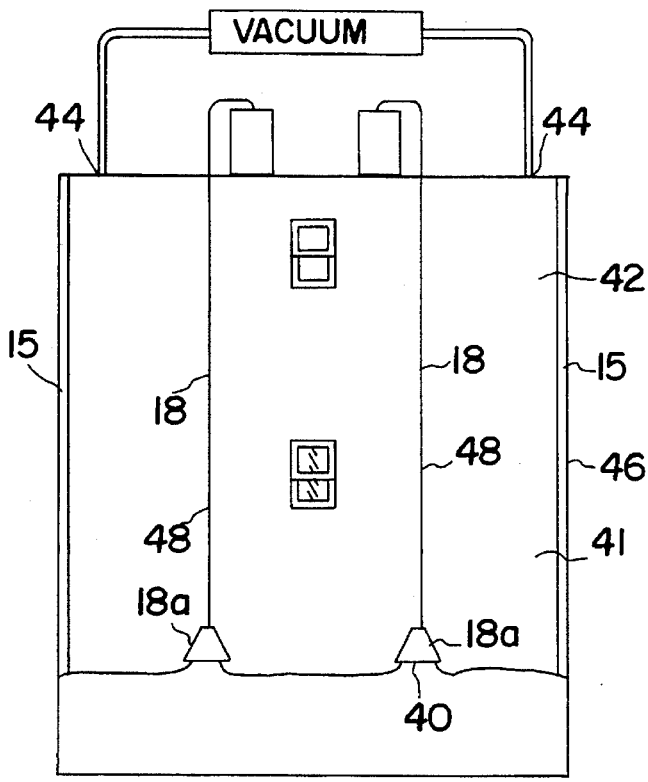
FIG. 3 is an isometric frontal view of a molding assembly similar to that shown in FIGS. 1 and 2 wherein building facing forms the mold surface upon which the fiber reinforced-resin is shaped and cured.

Referring to FIGS. 1 and 2 there is shown in plan view a resin transfer apparatus of this invention which comprises a dry preform 11 positioned on a mold surface of planar design, a fluid impervious sheet having a supply inlet 13 and a vacuum outlet 14 which is sealed around the perimeter of the mold 10 with vacuum seal tape 15 to form a vacuum envelope 16 and chamber 17 (FIG. 2). The chamber 17 constitutes the space between the inside face of vacuum envelope 16 and the upper face of the mold surface 10. When a vacuum is applied upon the mold surface 10 through vacuum outlet 14, gas within the vacuum envelope 16 is first evacuated and then the envelope 16 is pulled downwardly over its entire area against the dry preform 11 carried on the upper face of the mold surface 10. A curable resin such as a resin-catalyst mixture 19 is introduced through supply conduit 18 which is movable in supply inlet 13 shown having a gas tight seal in an O-ring arrangement 30. Supply conduit 18 is initially positioned at the extreme end of the mold surface away from the vacuum inlet 14. The flow of the resin-catalyst mixture 19 is pulled by the vacuum over and through the dry preform 11 until the vacuum envelope 16 is expanded and filled. The supply conduit 18 is withdrawn gradually from the vacuum envelope 16 until the envelope is filled the vacuum is stopped upon filling. The vacuum pulls the layers tightly together and sufficient resin is supplied to establish and maintain an advancing resin-catalyst mixture front 20 to uniformly impregnate and bond together the layers of the dry preform 11. The resin supply conduit 18, which can be operated manually or mechanically (not shown), is withdrawn at a rate sufficient to keep ahead of the resin-catalyst mixture front 20. The supply conduit 18 is preferably provided with a fan shaped delivery end 18a having a plurality of openings 18b.

The impregnated fabric is then cured producing a fiber-reinforced resin composite having very little if any porosity. The resultant reinforced fiber-resin structure is homogeneous, has high strength and a high reinforcing fiber-to-resin ratio.

FIG. 2 depicts isometrically and in cross section the mold assembly substantially the same as that described by reference to FIG. 1 employing the same mold components.

A second embodiment of this invention is illustrated in FIG. 3 which shows a building structure in front isometric view wherein the resin-catalyst mixture front 40 is moved vertically upward. The apparatus is substantially the same as that described in FIGS. 1 and 2 employing the same components but differs therefrom in that the vacuum envelope 46 is sealed over a rigid building face 42. The layers of dry preform 11 are held in position by draping or taping to the rigid building facing 42. The vacuum envelope 46 to which supply inlet 13 is attached encloses completely the reinforcing fiber dry preform 11 and it is sealed along the perimeter of the building facing 42 with vacuum seal tape 15. When a vacuum is applied, through vacuum outlets 44, the resin will be introduced through supply conduit 48 which is positioned at the bottom of the building facing and withdrawn ahead of the vertically upward moving resin-catalyst mixture front 40. The front 40 will ascend proportionally with the rate of evacuation.

Figure 4:
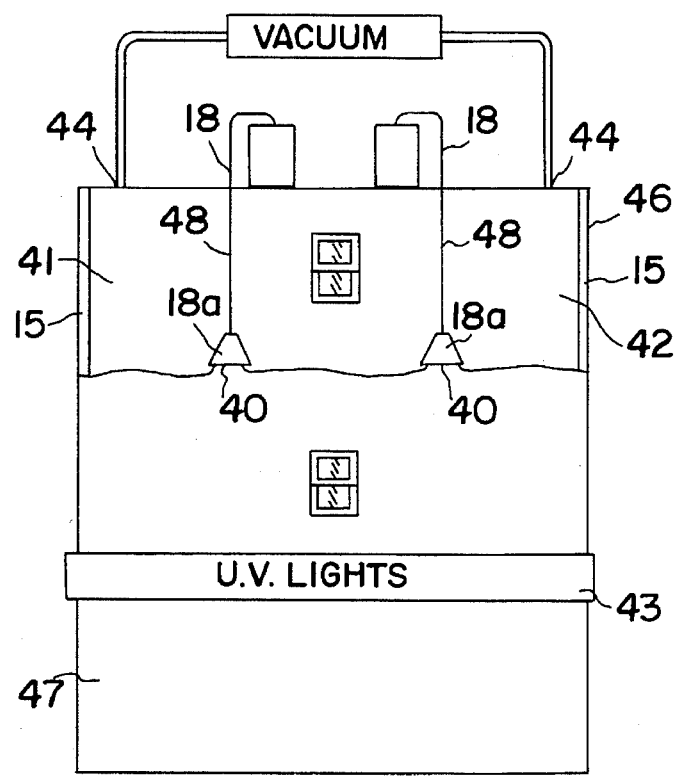
FIG. 4 is an isometric view of a molding assembly as shown in FIG. 3 showing an advancing resin-catalyst mixture front and a cured portion using ultraviolet radiation.

FIG. 4 is another embodiment of this invention which shows an isometric view of the building structure shown in FIG. 3 wherein a portion of the resin-catalyst is cured by photopolymerization using ultraviolet lamp 43. This embodiment also illustrates a continuous fabrication process whereby the introduction of the resin-catalyst mixture is continued while a portion 47 of the resin mixture is being cured. This continuous method provides a monolithic structure and avoids bond or sectional lines. For example, the cure line 24 would be undistinguishable from the rest of the structure facing.

Figure 5:
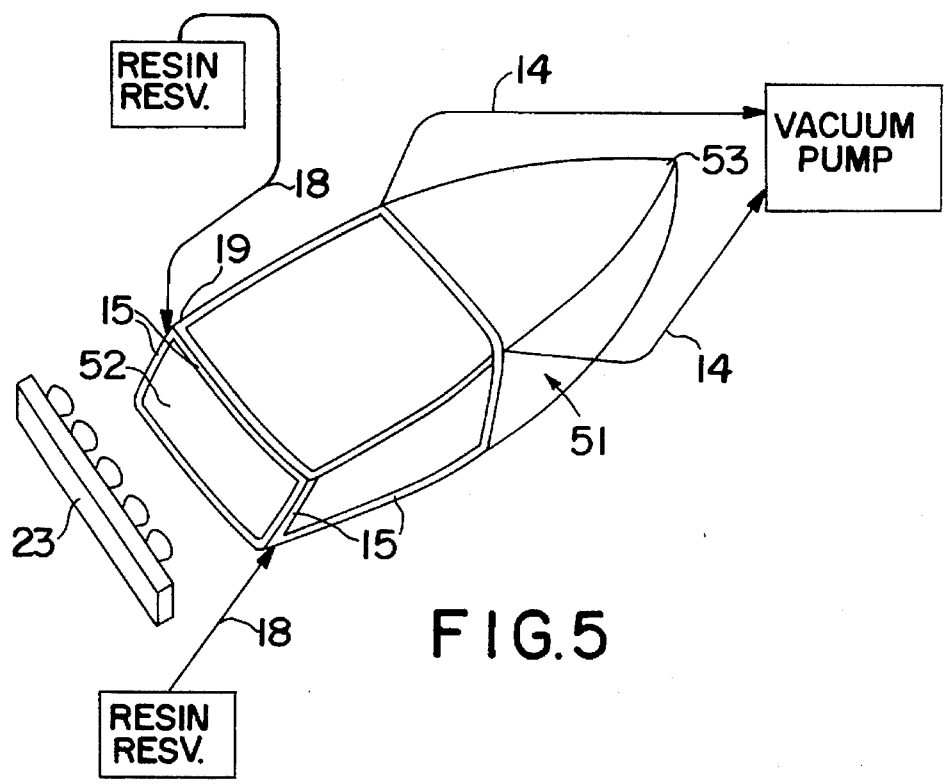
FIG. 5 depicts an isometric view of a molding assembly similar to that shown in FIGS. 1 and 2 wherein a boat mold forms the mold surface upon which the fiber reinforced-resin is shaped and cured.

FIG. 5 depicts isometrically the apparatus of FIGS. 1 and 2 employing the same components but differs therefrom in illustrating a repair to the stern 52 of a boat hull 51. The plurality of layers of dry reinforcing fabric or preform 11 are laid upon the stern 52. A vacuum envelope 16 to which a supply inlet 13 and a vacuum outlet 14 are attached encloses completely the preform lay-up 11. The outer peripheral edges of the vacuum envelope 16 are sealed with vacuum seal tape 15 to the hull 51 and stern 52. The supply conduit 18 are slidably movable through supply inlet to the stern 52 area. When evacuation is begun through vacuum outlet 14 and the resin-catalyst mixture 21 is introduced through the movable supply conduits 18 a resin-catalyst mixture front 21 is established. The supply conduits 18 are moved ahead of the front 22 towards the bow 53 and evenly distribute the mixture 21 over the entire stern section. The supply conduits 18 are withdrawn from the vacuum envelope 16. The resin-catalyst composite is cured by ultraviolet lamps 23. After curing the vacuum envelope 16 is removed and the process yields a tough monolithic repair a fabrication of the stern section 52.

The dry preform 11 is formed of a plurality of layers or plies of reinforced fiber. Each ply is formed of a plurality of reinforcing and/or supporting fiber. The fibers may be in any conventional form such as unidirectional, woven fabric, knitted fabric, swirl mat, felt mat, wound, braided, etc. The orientation of the fibers is based on the desired directional strength of the resultant fiber reinforced resin composite. Some plies lie parallel to a predetermined direction which is usually the direction of the major force likely to be applied to the resulting monolithic structure. Such fibers may be glass fibers, carbon fibers, aramid, boron fibers, or polymeric fibers marketed under the trademarks KAPTON® and KELVAR® by E.I. Dupont, Wilmington, Del.

The vacuum envelope 45 can be produced using substrate films comprised of a variety of materials. Preferred are thermoplastic polyamide films, particularly films made of nylon -6 or nylon -66. Additional examples include films made of polyethylene terephthalate, polyester ether ketone, polyetherimide, polyether sulfone, polytetrafluoroethylene, polyamide, teflon, acrylic resin and halohydrocarbon resins. The films may be mono- or biaxially oriented. The interior of the envelope can be ribbed, embossed, creaped or otherwise raised.

The supply conduit may be a metal and/or plastic pipe, tube or hose wherein the dispensing end has openings in various configurations such as oval, round, square, rectangular and triangular. The dispensing end could also have a fan configuration with multiple openings.

Figure 6:
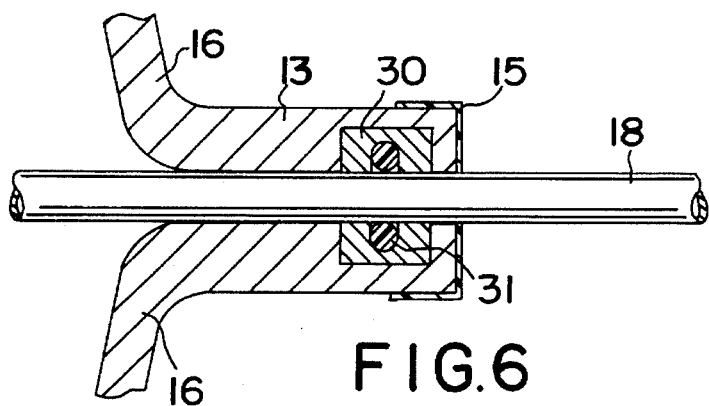
FIG. 6 shows a supply inlet means with an O-ring arrangement which is attached to the vacuum envelope according to this invention.

In FIG. 6 is shown an O-ring arrangement which represents the supply inlet means 13 attached to the vacuum envelope 16. In FIG. 6 is illustrated a cross sectional view of an O-ring arrangement 30 and comprises the vacuum envelope 16, O-ring 31, O-ring seal 32 and vacuum seal tape 15. The supply conduit 18 is positioned in the supply inlet means 13 and can be slidably moved within the o-ring arrangement 30 without materially effecting the vacuum conditions of the envelope 16.

Figure 7:
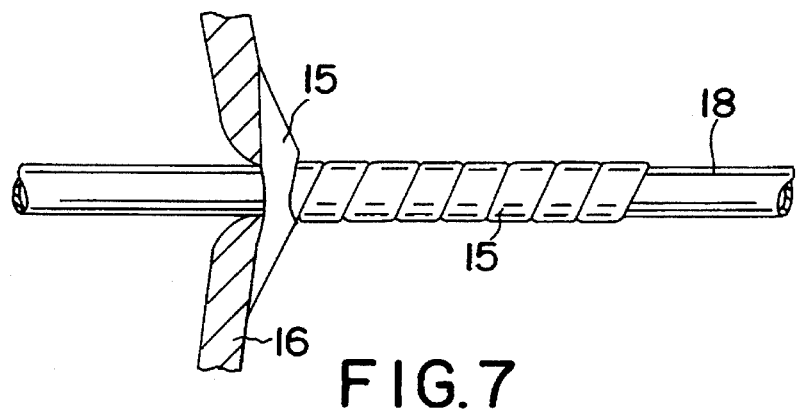
FIG. 7 shows a supply inlet means with a plastic collar arrangement attached to the vacuum enveloped according to this invention.

FIG. 7 illustrates another embodiment of the supply inlet means 13. In this instance, the supply conduit 18 is wrapped with plastic film, preferably of the same material as the vacuum envelope 16 to form a tight collar 40. The tight collar 40 is taped and sealed to the supply inlet 13 such that the supply conduit 18 is slidably movable within the collar 40.

In accordance with another embodiment of the invention, the process comprises the light curing a panel or structure but shading the edges or sections which are to be utilized for bonding or adhering to an additional panel or part. The panel or part light cures totally except where it has been shaded and therefore remains tacky or sticky. The uncured new panel or part is then attached to the resin wet places on the original cured part or panel. The new panel or part is then cured. If additional bonding is required, more of the original or second part is blocked from the light to permit more uncured area. Therefore, this is a method for bonding any light cured resin system to itself when curing is staged for various sections sequentially. In the area that is left uncured until the next section is overlapped with it, the fiber reinforcement is intermingled or overlapped appropriately so as to permit no weakness in the reinforcement.

Accordingly, there is solved the continuing problems in fabricating composite parts of resin and fiber reinforcement is the difficulty of bonding between one cured section and the new section or part being laid down and subsequently cured. Often panels or large sections cannot be done practically as on large section or panel and must be laid down and cured in sequential sections. This produces a bond line which is always weaker. In order to overcome this deficiency in making multisection composite sections by light curing techniques, a means is needed to always bond to an uncured section or edge of the previous cured section.

An example of this embodiment is the reinforcement of a wall whereby the wall area is bagged or sealed off with a layer of reinforcing fiber glass fabric under an impermeable film. The sealed off area is placed under vacuum at the top of the sealed off area and resin is permitted to flow in at the bottom of the wall or sealed off layer toward the top. Due to gravity, resin density, and viscosity factors, the resin will only rise to given level between 20 to 25 feet although 10–15 feet may be practical. The resin is light cured through the clear bagging film with the upper edge ¼" to possibly 1 foot covered with a light impermeable strip of paper or plastic or metal sheet. Upon curing this first section, the next section of the wall above the cured first section of the wall is bagged or sealed off with the bottom edge of the sealed off area being at the top edge of the cure area with the uncured area within the sealed off or bagged area. Vacuum is again applied to bring the resin flow up to a given area thus producing a second section of reinforcement for the wall with the new resin mixing and touching the previously uncured edge from the previous lay up. This produces an intimate bond and is actually a continuous sheet of reinforcement with no bond line between the two sections.

The invention is not limited to any particular genus of resin. Rather, a wide variety of resins are available that will adequately flow through a dry preform when the invention is practiced in the manner heretofore described. Resins include epoxy, olefinically unsaturated polyesters, vinyl esters and an olefinically unsaturated monomer copolymerizable therewith. The viscosities of resins range from about 100 cps to about 1000 cps over a temperature range between 200 degrees to 340 degrees F.

The polyester resins used in the invention can be prepared in any convenient manner and is generally composed for one or more aliphatic and/or cycloaliphatic, mono-, di and/or polyvalent alcohols and one or more monovalent carboxylic acids and/or esters thereof. As examples of suitable alcohols may be alcohols and one or more monovalent carboxylic acids and/or esters thereof. As examples of suitable alcohols may be mentioned benzyl alcohol, ethylene glycol, propylene glycol, neopentyl glycol, hexanediol, dimethylol cyclohexane 2,2-bis-(4-hydroxycyclohexyl) propane, 2,2-bis-(p-phenyleneoxyethanol)-propane, 2,2-bis-(p-phenyleneoxypropanol-2)-propane, diethylene glycol, glycerol, trimethylol ethane, trimethylol ethane, trimethylol propane, pentaerythritol and/or dipentaerythritol. Instead of, or besides the alcohol compound(s) one or more epoxy compounds may be used, for instance ethylene oxide, propylene oxide, epoxy propanol and isodecanoic glycidyl ester. As examples of suitable di- or polyvalent carboxylic acids may be mentioned maleic acid, fumaric acid, itaconic acid, citraconic acid, malonic acid, succinic acid, glutaric acid, adipic acid, azelaic acid, succinic acid, glutaric acid, adipic acid, azelaic acid, sebacic acid, tetrahydrophthalic acid, hexahydrophthalic acid, dichlorophthalic acid, isophthalic acid, terephthalic acid and/or trimellitic acid. The carboxylic acid also may be used in the form of an anhydride should be employed besides isophthalic acid and/or orthophthalic acid. Optionally, the polyester resin may contain saturated or unsaturated monocarboxylic acids such as synthetic and/or natural fatty acids having 2 to 36 carbon atoms or esters prepared from these carboxylic acids and polyvalent alcohols such as glycerol. As examples of suitable monocarboxylic acids may be mentioned fatty acid precondensates having 5 to 10 carbon atoms, heptanoic acid, pelargonic acids, isononanoic acid, lauric acid, stearic acid, oleic acid, linoleic acid, linolenic acid, cerotic acid, benzoic acid, tert-butylbenzoic acid, acrylic acid and/or methacrylic acid.

The polyester resin may be prepared in any convenient manner, for instance by the melting process, in which reaction of the components takes place with evaporation of the water evolved in the reaction. Alternatively, however, use may be made of the solvent process, in which the water is removed azeotropically with, for instance, an organic solvent such as toluene or xylene, after which generally the volatile constituents are to the desired extent removed in vacuo.

As ethylenically unsaturated monomer any usual monomer may be employed. As examples of suitable monomers may be mentioned styrene, α-methyl styrene, vinyl toluene, divinyl benzene, diallyl phthalate and acrylic or methacrylic (hydroxy) esters of alcohols having 1 to 12 carbon atoms such as methanol, ethanol, propanol, butanol, ethylene glycol, propylene glycol, neopentyl glycol, butanediol, hexanediol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 2 to 55% by weight, based on the polyester composition.

The resin may be cured thermally with conventional catalysts used in the reinforced fiber-resin art including free radical generating compounds such as organic peroxide catalysts. A preferred curing method involves photopolymerization. Curing may be done in a continuous manner.

The process can be repeated to give a multi-layer composite. Compatible resins may be used to give a multi-layer composite and provide either esthetic affects or increased structural strength or both.

In the present invention, the resin and catalyst may be mixed just prior to introduction into the vacuum envelope or they may be introduced separately relying on the dynamics of the system to mix these components sufficiently. In the preferred photocuring process the catalyst can comprise any conventional photoinitiators and/or photosensitizers. The preferred photoinitiators are isobutyl benzoin ether and α, α-diethoxyacetophenone. Mixtures of photoinitiators may be used. The preferred photosensitizers are the acylphosphine oxides as disclosed in U.S. Pat. No. 4,265,723, which is herein incorporated by reference, and the photosensitizers which have a triplet energy in the range of about 54 to 72 kilocalories per mole as disclosed U.S. Pat. No. 4,017,652, which is herewith incorporated by reference.

Any suitable source that emits ultraviolet light, viz., electromagnetic radiation having a wave length in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirling flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2037, 60-0197, 60-0393, and 60-2081 and Hanovia Models 6512A431, 6542A431, and 6477A431.

The time of exposure to ultraviolet light and the intensity of the ultraviolet light to which the coating composition is exposed may vary greatly. Generally the exposure to ultraviolet light should continue until the polymerization is complete.

The technique described herein are capable of some variations without departing the spirit and scope of this invention as will be apparent to those of skill in this art.

What is claimed:

1. A method of forming a large cured fiber reinforced-resin composite structure comprising the steps of:
   providing at least one reinforcing fiber mat or fabric;
   enclosing said fiber mat or fabric in a vacuum envelope comprising a fluid impervious material having at least one vacuum port and at least ore resin supply inlet having a gas tight seal and a supply conduit inserted therethrough;
   positioning said supply conduit at the opposite end of the vacuum envelope from the vacuum ports;
   evacuating said vacuum envelope and introducing a flow of a curable resin composition through said supply conduit at a flow rate up to about the rate of evacuation and to establish and maintain an advancing resin front and withdrawing from said envelope said supply conduit at a rate sufficient to keep equal or ahead of said resin front to uniformly distribute said resin composition to every part of said vacuum envelope until said vacuum envelope is filled; stopping the evacuation when the vacuum envelope is filled with the resin;
   withdrawing the supply conduit; and curing said resin to form said composite structure.

2. The method of claim 1 wherein the resin is a thermosetting resin.

3. The method of claim 2 wherein the thermosetting resin is selected from an olefinically unsaturated monomeric monomer or an epoxy resin.

4. The method of claim 3 wherein the thermosetting resin is selected from an unsaturated polyester, vinyl ester or acrylic resin.

5. The method of claim 1 wherein a catalyst and resin are separately introduced into said vacuum envelope and are mixed by the dynamics of the fluid flow.

6. The method of claim 5 wherein a free radical generating compound is mixed with the resin prior to introduction into said vacuum envelope.

7. The method of claim 5 wherein the catalyst is a photocatalyst.

8. The method of claim 7 wherein said photocatalyst comprises an ultraviolet photosensitizer and an ultraviolet photoinitiator.

9. The method of claim 7 wherein said photocatalyst comprises a photosensitizer.

10. The method of claim 9 wherein said photocatalyst includes a photoinitiator.

11. The method of claim 1 including the step of placing a cured fiber reinforced composite adjacent to an uncured fiber reinforced composite and then curing said uncured composite so as to bond both composites together.

12. The method of claim 11 wherein said composites are cured with ultraviolet radiation.

* * * * *